(12) United States Patent
Ghoshal

(10) Patent No.: US 6,452,740 B1
(45) Date of Patent: *Sep. 17, 2002

(54) MULTI-STAGE THERMOELECTRIC MICROCOOLERS FOR COOLING WRITE COILS AND GMR SENSORS IN MAGNETIC HEADS FOR DISK DRIVES

(75) Inventor: Uttam Shyamalindu Ghoshal, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 28 days.

This patent is subject to a terminal disclaimer.

(21) Appl. No.: 09/734,114

(22) Filed: Dec. 11, 2000

(51) Int. Cl.$^7$ .............................................. G11B 33/14
(52) U.S. Cl. ........................ 360/97.02; 360/123; 62/3.2
(58) Field of Search ........................ 360/317, 123–124, 360/97.02, 126; 62/3.2, 3.3, 3.7, 259.2; 136/201, 203–204

(56) References Cited

U.S. PATENT DOCUMENTS

| | | | | |
|---|---|---|---|---|
| 5,456,081 A | * | 10/1995 | Chrysler et al. | 136/204 |
| 5,724,818 A | * | 3/1998 | Iwata et al. | 62/259.2 |
| 5,941,079 A | * | 8/1999 | Bowman et al. | 60/526 |
| 6,105,381 A | * | 8/2000 | Ghoshal | 62/259.2 |
| 6,222,113 B1 | * | 4/2001 | Ghoshal | 136/201 |
| 6,256,996 B1 | * | 7/2001 | Ghoshal | 136/203 |
| 6,282,907 B1 | * | 9/2001 | Ghoshal | 62/3.2 |
| 6,347,521 B1 | * | 2/2002 | Kadotani et al. | 136/204 |

FOREIGN PATENT DOCUMENTS

JP        63-175202       *  7/1988

* cited by examiner

Primary Examiner—Brian E. Miller
(74) Attorney, Agent, or Firm—Duke W. Yee; Casimer K. Salys; Stephen R. Loe

(57) ABSTRACT

An improved read/write head for use in computer hard drives is provided. In one embodiment, the read/write head includes first and second thermally conducting plates and a first and second stage of microcoolers. The second thermally conducting plate is thermally coupled to a read sensor of the read/write head. The second microcooler includes a hot plate and a cold plate, wherein the cold plate extends proximate the read sensor so as to cool the sensor to ambient or below temperatures. The first thermally conducting plate extends between the write coil and the read sensor in the read/write head and is thermally coupled to the hot plate of the second microcooler. The hot plate of the first microcooler is thermally coupled to one or more heat dissipation elements.

16 Claims, 4 Drawing Sheets

MULTI-STAGE THERMOELECTRIC MICROCOOLERS FOR COOLING WRITE COILS AND GMR SENSORS IN MAGNETIC HEADS FOR DISK DRIVES

CROSS REFERENCE TO RELATED PATENTS

The present application is related to U.S. Pat. No. 6,105,381 entitled "METHOD AND APPARATUS FOR COOLING GMR HEADS FOR MAGNETIC HARD DISKS" issued Aug. 22, 2000 and to U.S. patent application Ser. No. 09/734,113 "THERMOELECTRIC MICROCOOLERS FOR COOLING WRITE COILS AND GMR SENSORS IN MAGNETIC HEADS FOR DISK DRIVES" filed even date herewith. The contents of the above mentioned commonly assigned U.S. Patent and co-pending U.S. Patent Application are hereby incorporated herein by reference for all purposes.

BACKGROUND OF THE INVENTION

1. Technical Field

The present invention relates generally to data storage devices within data processing systems and more particularly to a method and apparatus for alleviating elevated temperatures within the read/write head of a hard disk type data storage devices.

2. Description of Related Art

The requirement for high density magnetic storage of data on hard disk drives has been increasing steadily for the past several years. Hard disk drives include magnetic heads for reading and writing data to the hard disk. The heads include write coils and sensors for reading data from the disks. For purposes of the ensuing description of the assembly including the write coil and yoke will be referred to as the "write coil" and the assembly including the magnetoresistive sensor situated between magnetic shields will be referred to as the "read sensor"

Miniaturization of magnetoresistive (MR) sensors for disk drives in the early 1990's allowed disk drive products to maximize storage capacity with a minimum number of components. Fewer components result in lower costs, higher reliability, and lower power requirements for the hard disk drives.

MR sensors are used for the read element of a read/write head. MR sensors read magnetically encoded information from the magnetic medium of the disk by detecting magnetic flux stored in the magnetic medium of the disk. As storage capacity of disk drives has increased, the storage bit has gotten smaller and its magnetic field has correspondingly become weaker. MR heads are more sensitive to weaker magnetic fields than are the inductive read coils used in earlier disk drives. Thus, the move away from inductive read coils and to MR sensors for use in disk drives.

As discussed above, MR sensors are known to be useful in reading data with a sensitivity exceeding that of inductive or other thin film sensors. However, the development of Giant Magnetoresistive (GMR) sensors (also referred to as GMR head chips) has greatly increased the sensitivity and the ability to read densely packed data. Thus, although the storage capacity for MR disks is expected to eventually reach 5 gigabits per square inch of surface disk drive (Gbits/sq.in.), the storage capacity of GMR disks is expected to exceed 100 Gbits/sq.in.

The GMR effect utilizes a spacer layer of a non-magnetic metal between two magnetic metals. The non-magnetic metal is chosen to ensure that coupling between magnetic layers is weak. GMR disk drive read sensors operate at low magnetic flux intensities. When the magnetic alignment of the magnetic layers is parallel, the GMR sensor resistance is relatively low. When the magnetic alignment of the layers is anti-parallel, the resistance is relatively high. Heat generated in the read/write head together with heat from other components within the disk drive materially affects the operating temperature of the GMR read sensor in the head.

As GMR sensors allow extremely high data densities on disk drives, a stable sensor temperature is essential to accurately read operations in high track density hard disk drives. It is well known that the signal to noise ratio of GMR read sensors increases with a decrease in temperature. Various methods of cooling hard disk drive components are known and include forced air, cooling fins, and heat pipes. Generally, the cooling methods have been limited to attaching materials or structures that have high thermal conductivities to transfer heat away from the head. However, due to space limitations and ambient conditions, means for cooling, whether to ambient or subambient temperatures, are generally not available to the GMR read sensor.

As the requirements for the GMR read sensors have been increasing over the years, the requirements for the write coils within the disk drives have also been increasing. New disk drives require fast field reversal during the write operation. This requirement for fast field reversal during the write operation implies larger write currents. Also, as the storage densities increase, the media coercivity has to increase to avoid thermal instability and the superparamagnetic limit. This reinforces the need for even larger write currents. However, large write currents increase the Joule heating in the coil such that the coil temperatures are 40 to 80 degrees Celsius above ambient temperatures. However, for optimal operation, the write coils need to be kept near ambient temperatures. Furthermore, since the write coil is immediately adjacent the GMR read sensor in the head, the heating and elevated temperatures are shared by the GMR read sensor.

Therefore, it would be desirable to have a method and apparatus for cooling the GMR read sensor and the write coils in the heads of hard disk drives that would be practical and fit within the structure of the head without requiring serious structural changes to the hard disk drive. Cooling GMR read sensors would significantly enhance magnetic sensing capacity of the GMR read sensors during the read operation and increase performance of the write coils during a write operation. It would also be desirable to provide a practical method for cooling the heads to subambient temperatures that would allow the utilization of GMR materials that have significantly higher sensitivities.

SUMMARY OF THE INVENTION

The present invention provides an improved read/write head for use in computer hard drives. In one embodiment, the read/write head includes first and second thermally conducting plates and a first and second stage of microcoolers. The second thermally conducting plate is thermally coupled to a read sensor of the read/write head. The second microcooler includes a hot plate and a cold plate, wherein the cold plate extends proximate the read sensor so as to cool the sensor to ambient or below temperatures. The first thermally conducting plate extends between the write coil and the read sensor in the read/write head and is thermally coupled to the hot plate of the second microcooler. The hot plate of the first microcooler is thermally coupled to one or more heat dissipation elements.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
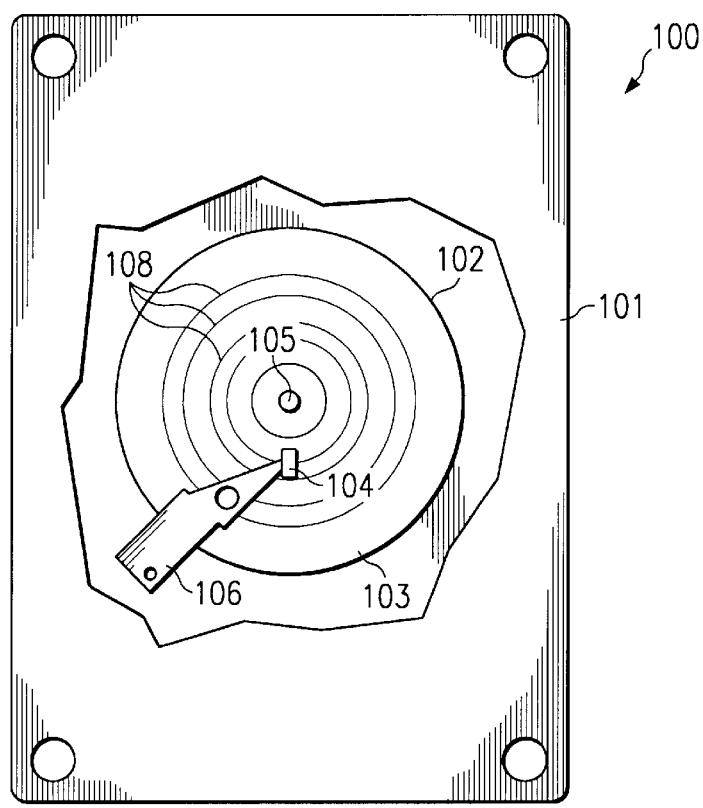
FIG. 1 depicts a cut-away, top plan view of a data storage system in accordance with the present invention.

With reference now to the figures, and in particular with reference to FIG. 1, a cut-away, top plan view of a hard disk data storage system is depicted in accordance with the present invention. Data storage system 100 includes a housing 101 containing at least one rotatable data storage disk 102 supported on a spindle 105 and rotated by a drive motor (not shown). Typically, a data storage system will comprise a plurality of disks and a slider 106 with a read/write head 104 for each disk. As an example, in a magnetic disk storage device, each data storage disk 102 has the capability of receiving and retaining data, through the use of a magnetic recording medium formed on at least one disk surface 103, where the magnetic recording medium is arranged in an annular pattern of multiple concentric data tracks 108. Though only a few data tracks 108 are shown, it is known that the number of tracks varies according to at least the recording medium and the read/write head 104. At least one slider 106, including one or more read/write heads 104 is positioned over data storage disk 102. Slider 106 is suspended from an actuator arm (not shown) by a suspension (also not shown) and the radial position of slider 106 with respect to data tracks 108 of data storage disk 102, is controlled by a voice coil motor (not shown).

During operation of data storage system 100, the rotation of data storage disk 102 generates an air bearing between head 104 and disk surface 103. The air bearing counterbalances a slight downward-biased spring force of the suspension and supports head 104 above disk surface 103 by a small, substantially constant spacing. As disk 102 is rotated by the drive motor, slider 106 is moved radially in and out in response to the movement of the actuator arm by the voice coil motor, permitting read/write head 104 to read and write data from and to the concentric tracks 108. Though only one read/write head 104 and slider 106 assembly is shown, it is well known that a plurality of sliders 106 may be employed to access a plurality of disks 102, stacked one atop the other on spindle 105.

The temperature of read/write head 104 may rise during operation of data storage drive 100 due to previously discussed magnetic field changes and ambient conditions in data storage system 100. The primary contributor of heat is the write coil. Magnetic instability may arise in read/write head 104 due to increasing read/write head 104 temperatures. Higher temperature increases the Johnson voltage noise of the read sensor and decreases the net signal to noise capability of the read sensor.

According to the present invention, a thermoelectric microcooler, is mounted on the read/write head 104 and thermally coupled to a cold plate situated between the write coil and the read sensor to provide active heat transfer of the energy dissipated by the write coil. Also, the microcooler device may utilize a separate power source or the same power source as the read/write head 104. Though Peltier effect thermoelectric cooling (TEC) devices are used to cool many heat producing components such as, for example, blood analyzers, lasers, and microprocessors, lack of efficiency and size has limited their applications.

Figure 2:
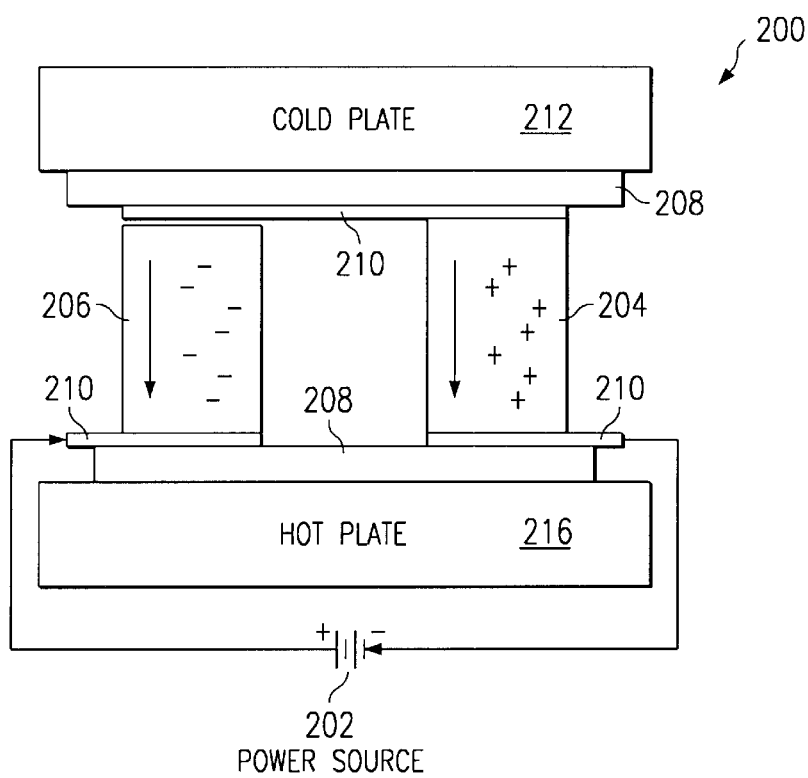
FIG. 2 depicts a high-level conceptual diagram of a Thermoelectric Cooling (TEC) device.

With reference to FIG. 2, a high-level block diagram of a generic TEC device 200 is depicted. Thermoelectric cooling, a well known principle, is based on the Peltier effect, by which DC current from power source 202 is applied across two dissimilar materials causing heat to be absorbed at the junction of the two dissimilar materials. A typical thermoelectric cooling device utilizes p-type semiconductor 204 and n-type semiconductor 206 sandwiched between poor electrical conductors 208 that have good heat conducting properties. N-type semiconductor 206 has an excess of electrons, while p-type semiconductor 204 has a deficit of electrons. As electrons move from p-type semiconductor 204 to n-type semiconductor 206 via electrical conductor 210, heat energy is transferred from cold plate 212 to hot plate 216.

Figure 3:
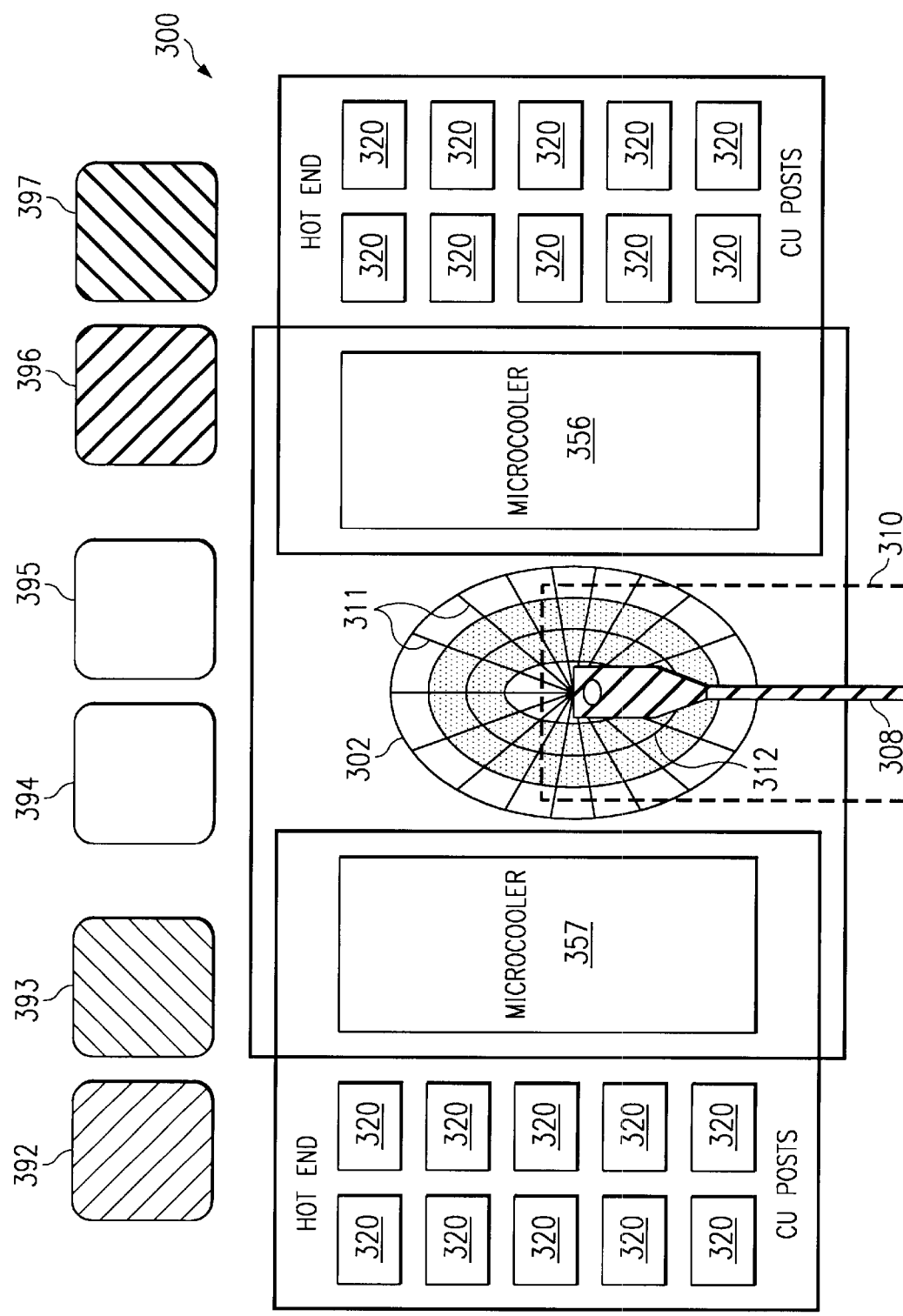
FIG. 3 depicts a planar view of a read/write head with cold plate using single stage thermoelectric microcoolers in accordance with the present invention.

With reference now to FIG. 3, a schematic diagram of a read/write head 300 for a disk drive is depicted in accordance with the present invention. The read/write head 300 includes a read sensor 308, bond pads 392–397, and a cold plate 302. The cold plate 302 is situated between the GMR read sensor and the write coil of read/write head 300. The relative position of the actual coils is depicted at 312, while the relative position of the magnetic shields is depicted at 310. Their functions and locations are well known. In one embodiment, cold plate 302 includes a patterned ring of copper (Cu) or tungsten (W). Given that cold plate 302 is electrically conducting, as is depicted in the present example, then cold plate 302 should be patterned with radial grooves 311 to electrically segment the cold plate such that eddy currents are suppressed. Thereby the coupling effects of the magnetic field produced by the are minimized.

In one embodiment, the read/write head 300 includes two thermoelectric microcoolers 356 and 357 thermally coupled to cold plate 302 and on the hot side to copper posts 320. Heat is thereby transferred from the cold plate, lying between the write coil and read sensor, to the disk drive interior ambient. Microcoolers 356–357 are fabricated using an electrodeposition method, which is a low temperature post-processing step after the head fabrication. More information regarding the fabrication of microcoolers is available in U.S. patent application Ser. No. 09/498,826 filed on Feb. 4, 2000 which is hereby incorporated by reference for all purposes.

In the prior art, a simple cooling plate of copper placed proximate the write coil and read sensor is thermally connected to copper posts without an intervening active cooling device. Thus, in the prior art, the read/write head write coil and adjacent read sensor were always at a temperature well above the disk drive interior ambient. The inclusion of the thermoelectric coolers 356–357 allows the write coils and read sensor of read/write head 300 to be actively cooled to a temperature less than in the prior art. Since the permeability of the yoke of the write coil and the signal to noise performance of the read sensor are sensitive to temperature, the use of microcoolers 356–357 in read/write head 300 greatly improves multiple aspects of the read/write head 308 performance. Also, since most of the heat is generated by the write coils, the shape and location of cold plate 311 should align with the write coils.

The plurality of copper posts 320 may be constructed from other material that is a good conductor of heat. Alternatively, posts 320 may be replaced by fins.

Figure 4:
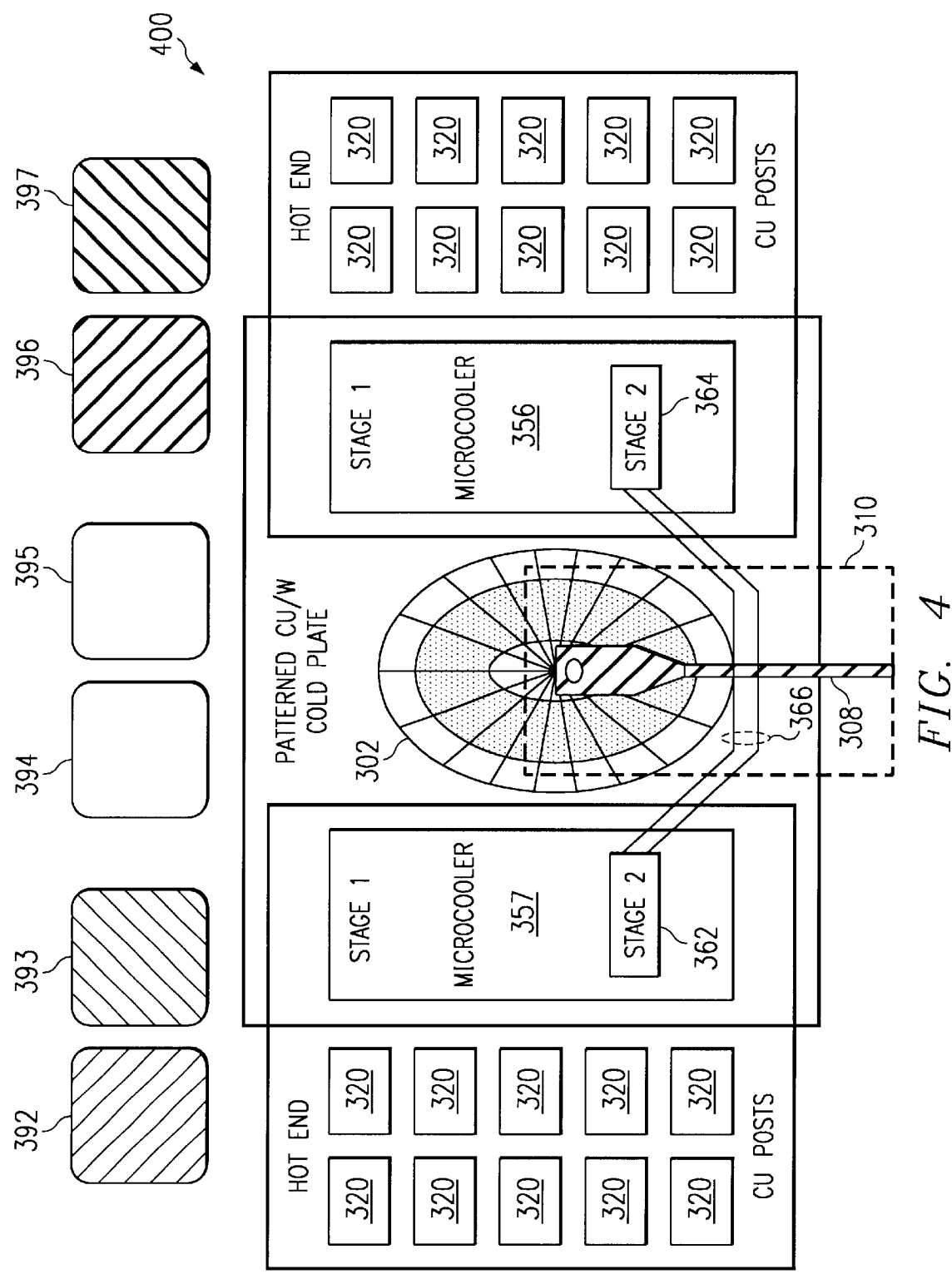
FIG. 4 depicts a planar view of a read/write head with cold plate using selectively acting two stage thermoelectric coolers in accordance with the present invention.

With reference now to FIGS. 4, a planar view of a read/write head 400 with two stage microcoolers is depicted in accordance with the present invention. In this embodiment, in addition to stage one microcoolers 356 and 357 as depicted in FIG. 3, stage two microcoolers 362–364 have also been included in the read/write head 400. In all other regards, the read/write head 400 is similar to read/write head 300 in FIG. 3. By using a two stage microcooler, the GMR read sensor 308 may be cooled to a point beyond that possible with the use of a single stage microcooler in further recognition of the temperature sensitivity exhibited by read sensor 308.

The cold plate 306 is thermally coupled to thermoelectric coolers 356–357 which are each in turn thermally coupled to posts 320. The cold plate of second stage thermoelectric microcoolers 362–364 is thermally coupled to arm 366, which is constructed from a thermally conductive material, such as, for example, copper, extends beneath but in close thermal proximity to GMR read sensor 308. The hot plate of second stage microcoolers 362–364 is thermally coupled to cold plate 306. Thus, the read sensor 308 is cooled to an even lower temperature than the write coils cold plate, and possibly event to subambient levels.

Because the read head generates much less heat than do the write coils, the second stage microcoolers 362–364 do not need to be as large as the first stage microcoolers 356–357. For similar reasons, arm 366, which serves as the cold plate for second stage microcoolers 362–364 does not need to be as large as cold plate 306.

Also, because the physical size of the read/write head elements depicted in FIGS. 3 and 4 are determined by the bond pads, which require much more room than is necessary to implement the basic write coils and read sensor, the cold plates and microcoolers may be included in the read/write head without materially increasing the size of the read/write head.

Figure 5:
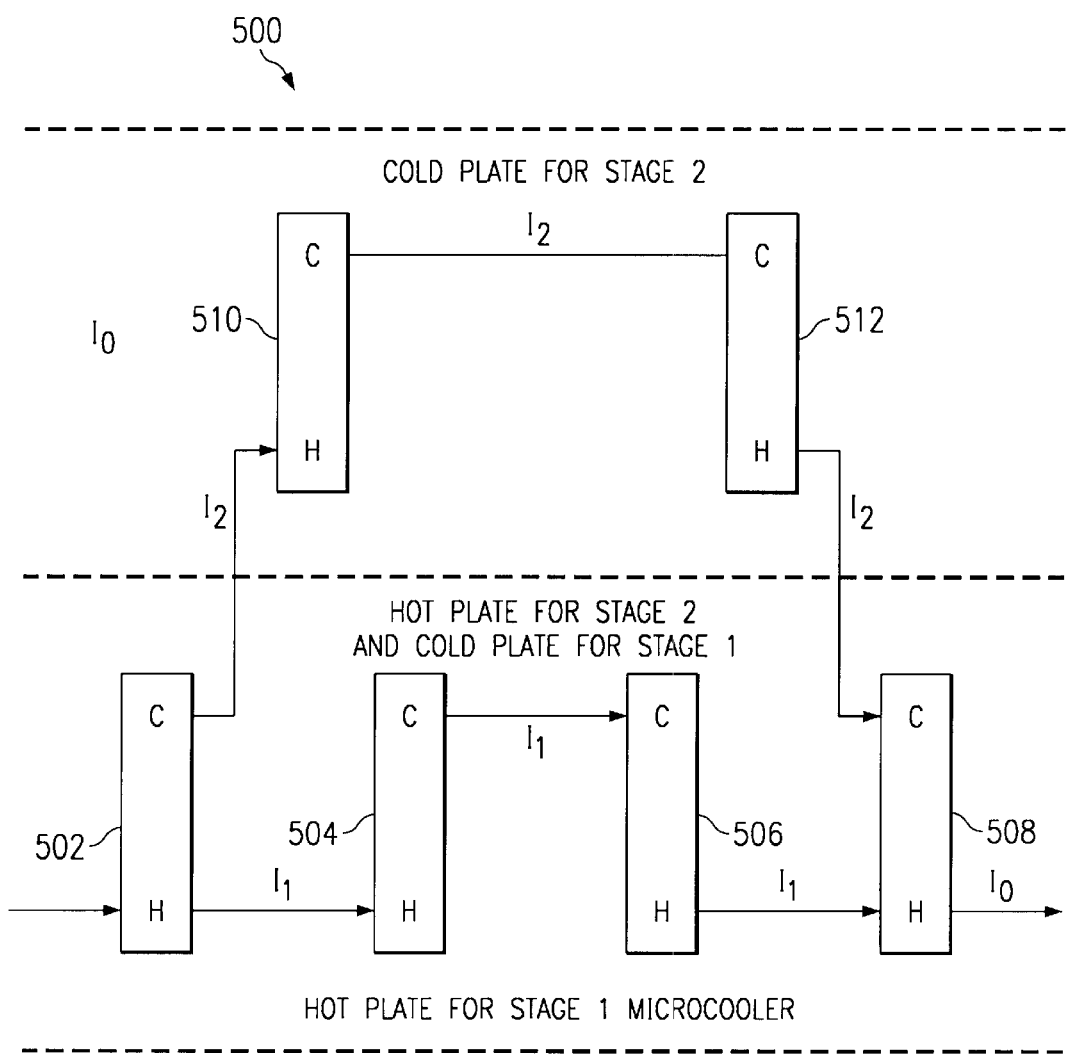
FIG. 5 depicts a conceptual diagram of a two stage thermoelectric cooler in accordance with the present invention.

With reference now to FIG. 5, a schematic diagram of a two stage thermoelectric cooler is depicted in accordance with the present invention. Two stage thermoelectric cooler 500 may be implemented as, for example, stage one microcooler 356 and stage two microcooler 364 in FIG. 4. Two stage microcooler 500 includes a first stage microcooler comprising p-type impurity thermoelectric material elements 502 and 504 and n-type impurity thermoelectric material elements 506 and 508. Two stage microcooler 500 also includes a second stage comprising p-type impurity thermoelectric material element 510 and n-type impurity thermoelectric material element 512.

A current $I_0$ is connected by conductor to thermoelectric material elements 502 and 504. The current $I_0$ is split into $I_1$ and $I_2$. Current $I_1$ passes through thermoelectric material element 504 and through region thermoelectric element 506. Current $I_2$ passes through thermoelectric material elements 502, 510, 512, and 508. The cold plate for the first stage microcooler is between the first stage and the second stage and is the hot plate for the second stage microcooler.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A read/write head for a magnetic storage device, comprising:
    a first thermally conducting plate situated between a write coil and a read sensor in the read/write head;
    a first microcooler comprising a hot plate and a cold plate, wherein the cold plate is thermally coupled to the first thermally conducting plate and the hot plate is thermally coupled to one or more heat dissipation elements;
    a second thermally conducting plate thermally coupled to the read sensor of the read/write head; and
    a second microcooler comprising a hot plate and a cold plate, wherein the cold plate is thermally coupled to the second thermally conducting plate and the hot plate is coupled to the cold plate of the first microcooler.

2. The read/write head as recited in claim 1, wherein the heat dissipation elements comprise posts.

3. The read/write head as recited in claim 1, wherein the heat dissipation elements comprise fins.

4. The read/write head as recited in claim 1, wherein the heat dissipation elements include copper.

5. The read/write head as recited in claim 1, wherein the first thermally conducting plate includes electrically conducting materials and is patterned to reduce eddy currents.

6. The read/write head as recited in claim 5, wherein the electrically conducting materials include copper.

7. The read/write head as recited in claim 5, wherein the electrically conducting materials include tungsten.

8. A disk drive with a read/write head, comprising:
    a rotating magnetic storage medium;
    a head positioning apparatus operable to selectively locate the read/write head proximate selected positions on the rotating magnetic storage medium; and
    a head cooler integral to said read/write head, wherein the head cooler includes:
        a first thermally conducting plate situated between a write coil and a read sensor in the read/write head;
        a first microcooler comprising a hot plate and a cold plate, wherein the cold plate is thermally coupled to the first thermally conducting plate and the hot plate is thermally coupled to one or more heat dissipation elements;
        a second thermally conducting plate thermally coupled to the read sensor of the read/write head; and
        a second microcooler comprising a hot plate and a cold plate, wherein the cold plate is thermally coupled to the second thermally conducting plate and the hot plate is coupled to the cold plate of the first microcooler.

9. The drive as recited in claim 8, wherein the first stage microcooler comprises a thermoelectric cooler.

10. The drive as recited in claim 8, wherein the second stage microcooler comprises a thermoelectric cooler.

11. The drive as recited in claim 8, wherein the first cold plate includes electrically conducting materials.

12. The drive as recited in claim 11, wherein the electrically conducting materials include copper.

13. The drive as recited in claim 11, wherein the electrically conducting materials include tungsten.

14. The drive as recited in claim 8, wherein the heat dissipation elements include posts.

15. The drive as recited in claim 8, wherein the heat dissipation elements include fins.

16. The drive as recited in claim 8, wherein the heat dissipation elements comprise copper.

* * * * *

UNITED STATES PATENT AND TRADEMARK OFFICE
CERTIFICATE OF CORRECTION

PATENT NO. : 6,452,740 B1
DATED : September 17, 2002
INVENTOR(S) : Ghoshal

It is certified that error appears in the above-identified patent and that said Letters Patent is hereby corrected as shown below:

Column 1,
Line 11, after "09/734,113", please insert -- entitled --.

Signed and Sealed this

Thirteenth Day of May, 2003

JAMES E. ROGAN
*Director of the United States Patent and Trademark Office*